United States Patent
Knowles

[15] 3,671,637
[45] June 20, 1972

[54] REPELLANT COMPOSITION COMPRISING CERTAIN CYCLOHEXYL UREAS AND THIOUREAS

[72] Inventor: Richard N Knowles, Hockessin, Del.
[73] Assignee: E. I. du Pont de Nemours and Company, Wilmington, Del.
[22] Filed: Oct. 24, 1968
[21] Appl. No.: 770,448

Related U.S. Application Data

[60] Division of Ser. No. 635,301, April 20, 1967, which is a continuation-in-part of Ser. No. 574,498, Aug. 18, 1966.

[52] U.S. Cl. ............................................ 424/322, 424/304
[51] Int. Cl. ...................... A01n 9/12, A01n 9/18, A01n 9/20
[58] Field of Search .................. 424/322, 304; 260/552, 553

[56] References Cited

UNITED STATES PATENTS 3,000,940  9/1901  Raasch ................................ 260/553
2,551,378  5/1951  Kirby .................................. 260/553

Primary Examiner—Leland A. Sebastian
Attorney—Herbert W. Larson

[57] ABSTRACT

Repelling animals with 1-(4-higher alkyl-substituted cyclohexyl)-3-alkyl and 3,3-dialkylureas and thioureas of the formula:

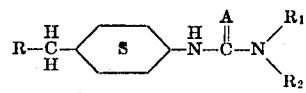

wherein
R is alkyl, cycloalkyl, cycloalkylalkyl, bicycloalkyl or tricycloalkyl;
$R_1$ and $R_2$ are hydrogen, alkyl, haloalkyl, cyanoalkyl, nitroalkyl, alkoxyalkyl, or thioalkoxyalkyl, and
A is oxygen or sulfur. Typical is 1-(cis-4-cyclohexylmethylcyclohexyl-3-methyl-urea useful as an animal repellant.

10 Claims, No Drawings

REPELLANT COMPOSITION COMPRISING CERTAIN CYCLOHEXYL UREAS AND THIOUREAS

CROSS REFERENCE

This application is a divisional of my copending application Ser. No. 635,301, filed Apr. 20, 1967 which in turn is a continuation-in-part of my application Ser. No. 574,498, filed Aug. 18, 1966.

BACKGROUND OF THE INVENTION

U. S. Pat. application Ser. No. 532,544, filed Mar. 1, 1966, now abandoned discloses compounds containing cyclohexyl ring structures having utility as animal repellants. I have now discovered another class of compounds containing a cyclohexyl ring structure which also has utility as animal repellants.

SUMMARY OF THE INVENTION

This invention relates to substituted cyclohexylureas.

More specifically this invention refers to 1-(4-higher alkyl substituted cyclohexyl)-3-alkyl and 3,3-dialkylureas and thioureas, compositions containing them and methods of applying them to animals.

Potent animal inhalation irritant effects are achieved by applying to animals or their habitat, compounds of the formula:

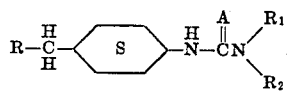

wherein
R is alkyl of three through eight carbon atoms, cycloalkyl of four through nine carbon atoms, cycloalkylalkyl of five through 10 carbon atoms, bicycloalkyl of seven through 10 carbon atoms, and tricycloalkyl of 10 through 11 carbon atoms;
$R_1$ and $R_2$ can be the same or different and are hydrogen, alkyl of one through four carbon atoms, haloalkyl of one through four carbon atoms, cyanoalkyl of one through four carbon atoms, nitroalkyl of one through four carbon atoms, alkoxyalkyl where the alkoxy is one through four and the alkyl is one through four carbon atoms and thioalkoxyalkyl where the thioalkoxy is one through four and the alkyl is one through four carbon atoms;
A is oxygen or sulfur.

Substitutions on the cyclohexyl ring must be in the cis configuration to obtain optimum irritant effects.

Most preferred because of high irritant effects at a low use rate is 1-(cis-4-cyclohexylmethylcyclohexyl)-3-methylurea.

UTILITY

Compounds of this invention cause potent irritation to animal tissue, particularly to the mucous membranes.

Animals exposed to the above compounds show signs of severe respiratory irritation and are quickly incapacitated. These compounds have two advantages over currently used riot control agents such as 2-chloroacetophenone (CN), and animal repellants such as allylisothiocyanate for dogs and bone tar oil for deer. One, the compounds are more potent at low concentrations and two, provide residual activity over longer periods of time.

Compounds of this invention and particularly 1-(4-cis-cyclohexylmethylcyclohexyl)-3-methylurea have potential use as riot control agents, dog repellants, deer repellants, rodent repellants and for contaminating caves or underground tunnels.

PREPARATION

The compounds of this invention can be prepared by several different synthesis routes which are illustrated below. R, $R_1$, $R_2$ and A in the below equations are as defined in formula (1).

Since cis/trans mixtures of amines are used, the resulting ureas are also cis/trans mixtures. The irritant ureas can be used without separation of the isomers. The cis:trans ratio ranges from 1:1 to 3:1 and depends on the method of synthesis of the amines.

Synthesis Route A—3-alkylureas

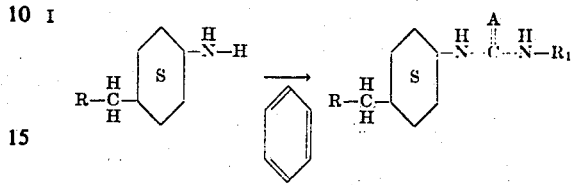

The amine and isocyanate are carefully mixed into stirring benzene. The solution is then refluxed for several hours to insure completion of the reaction. Since isocyanates react with water, the reaction system should be kept dry. The benzene is evaporated in vacuum and the residual urea is purified by recrystallization.

Synthesis Route B.—3-alkyl and 3,3-dialkylureas

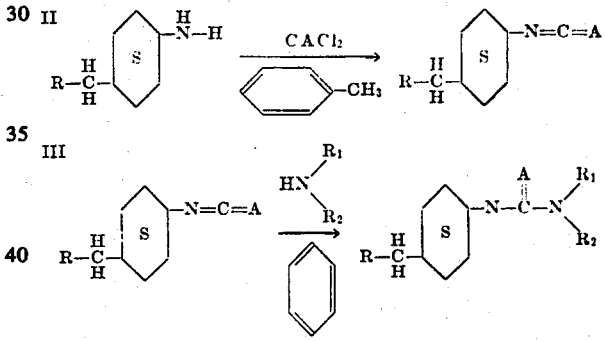

The preparation of the isocyanates or isothiocyanates in Reaction II is performed by the addition of the desired amine to a cold toluene solution containing a 10 percent excess of phosgene or thiophosgene. The carbamyl or thiocarbamyl complex precipitates. The stirring slurry is slowly heated to reflux; reflux is continued until the slurry dissolves and hydrogen chloride evolution stops. The isocyanates or isothiocyanate is isolated and purified by distillation.

The urea preparation in REaction III is similar to that described for Reaction I above.

The compounds of this invention are white crystalline materials which are easily purified by recrystallization from conventional solvents. If desired, the cis and trans isomers can be separated by chromatography over silicic acid using chloroform as eluant. The ratio of silicic acid to compound is 50:1.

The amine intermediates are prepared by the following reaction sequence. R is as defined in formula (1).

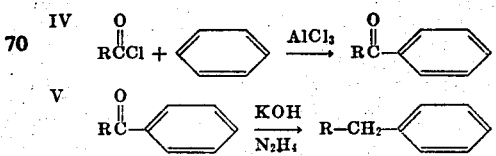

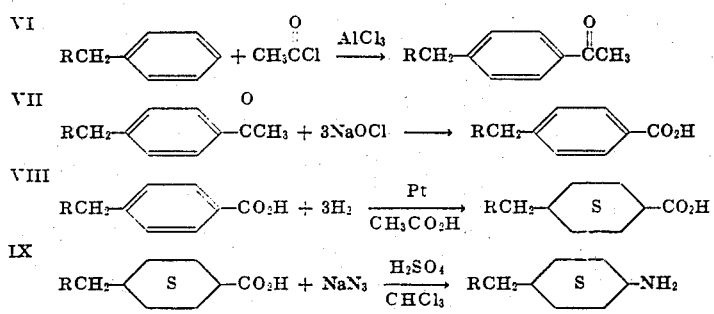

The Friedel-Crafts reaction (IV) is run by slowly adding the acid chloride to a stirring mixture of aluminum chloride and benzene. A slight molar excess of catalyst is used; benzene serves as both a solvent and reactant. The acid chloride is added at a rate sufficient to keep the temperature of the slurry at about 30°–40° C. The mixture is stirred for one additional hour after all the acid chloride is added, and then water is slowly added to decompose the catalyst. Sufficient water is added to insure that all the solids are dissolved. The phenylalkyl ketone is isolated from the benzene solution and is purified by distillation.

The Wolff-Kishner reduction (V) is run in 2-(2-ethoxyethoxy)ethanol using a modification of the procedure given by J. Cason et al. in *Organic Synthesis*, Volumn IV, John Wiley and Sons, New York, (1963), p. 510. Once the reactants are mixed, they are heated to reflux for a period of three to five hours. The reflux temperature is generally in the 130° to 140° C. range. After completion of the reflux period, the solution is cooled and poured into three to four volumes of water. The alkylbenzene product is extracted with pentane, and purified by distillation.

The Friedel-Crafts reaction (VI) is run by mixing approximately equimolar quantities of the reactants together in hexane or nitromethane at less than 5° C. The stirring mixture is slowly allowed to warm to room temperatures, and when hydrogen chloride evolution subsides, the mixture is refluxed several hours. Water is then added slowly to decompose the catalyst. A sufficient quantity of water is then added so that all of the solids are dissolved. The desired acetophenone derivative is isolated from the organic phase and purified by distillation. Gas-liquid chromatography on an F & M Model 500 Gas Chromatograph using a 2 by ¼ inch O.D. stainless steel column containing 10 percent Carbowax 20M on 60–80 mesh Diatoport T indicates that about 98 percent of the acetophenone is the 1,4-isomer and 2 percent is the 1,2-isomer. The 1,2-isomer has the shorter retention time.

The haloform reaction (VII) is run by slowly adding a cold (<5° C.) sodium hypochloride solution to a stirring solution of the acetophenone derivative in methanol. This is a modification of the procedure used by E. E. Royals, J. Am. Chem. Soc., 69, 841 (1947) for the haloform reaction of α-ionone. After the sodium hypochloride solution is added, the mixture is warmed to room temperature, and left standing overnight. The mixture is heated to reflux, and the distillate collected until the pot temperature rises to 95°–97° C.; most of the methanol is distilled. The pot is then cooled to room temperature. In those reactions where R is a low molecular weight radical such as butyl, the sodium benzoate derivative remains dissolved; however, when R is a high molecular weight radical such as octyl, the sodium benzoate derivative precipitates as a soapy solid. Sulfur dioxide is bubbled into the alkaline pot concentrate until the pH drops below 3. The precipitated benzoic acid derivative is either filtered and washed with water, or extracted with methylene chloride depending on whether or not the benzoic acid is easily filterable or is of a soapy nature. Some of these benzoic acid derivatives can be recrystallized from acetonitrile or pentane, and some are purified merely by trituration with cold pentane.

The catalytic hydrogenation (VIII) is performed at 2 to 3 atmospheres of hydrogen using platinum oxide as catalyst and glacial acetic acid as solvent. A Parr Hydrogenation Apparatus is suitable for these reactions. This reaction produces a cis to trans isomer mixture of about 2 or 3 to 1. The cis and trans designation refers to the relationship of the 4-alkyl substituent and carboxylic acid group on the cyclohexane rings. This is illustrated below.

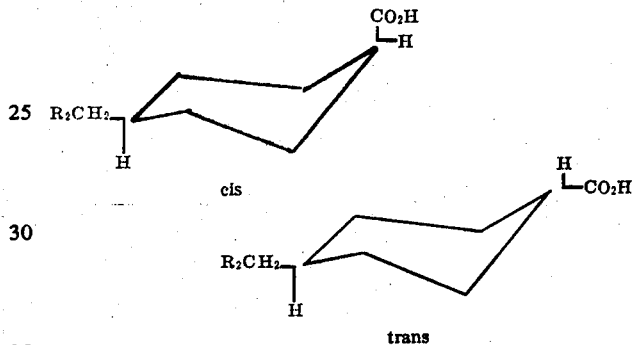

The Schmidt reaction (IX) is performed by dissolving the cyclohexane carboxylic acid derivative in a mixture of chloroform and concentrated sulfuric acid. Sodium azide is then added in small portions to the stirring mixture at a rate sufficient to keep the reaction temperature between 35 and 45° C. The mixture is stirred at about 45 to 50° C. until the bubbling nearly stops (1 to 3 hours). The mixture is then transferred to a separatory funnel, and the lower, gelatinous sulfuric acid layer is slowly dripped into ice. The amine sulfate precipitates as a soapy material which slowly crystallizes. The chloroform should be kept away from the ice water mixture since it makes the work-up much more difficult. Those amines which crystallize as the hemi-sulfates or sulfates are filtered and washed with water. It is convenient to store the amines as their salts. Those amine salts which fail to crystallize are converted to the free bases by making the sulfuric acid solution alkaline and extracting the amine with dichloromethane. The amine is then purified by distillation. The Schmidt reaction proceeds without changing the cis/trans product ratio.

An alternative synthesis route can be used for these amine intermediates if the appropriately substituted aniline derivatives are available. This route is illustrated below.

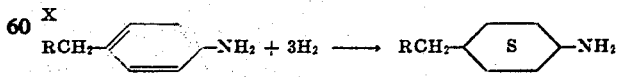

The hydrogenation (X) can be performed on a Parr Hydrogenation Apparatus using platinum oxide as catalyst and glacial acetic acid as solvent. The cis/trans ratio of the cyclohexylamine products is about 1:1.

COMPOSITIONS

Compounds of this invention can be administered alone, but are generally contained in a composition with an inert diluent non-toxic to animals. The diluent selected depends on the route of administration.

Emulsifying agents can be used with the diluent and compound of formula (1) to aid in dispersion of the active ingredient. Emulsifying agents that could be used include alkylaryl polyethoxy alcohols, alkyl and alkylaryl polyether alcohols, polyoxyethylene sorbitol or sorbitan fatty esters, polyethylene glycol fatty esters, fatty alkylol amide condensates, amine salts of fatty alcohol sulfates plus long chain alcohols and oil soluble petroleum sulfonates.

The amount of emulsifying agent in the composition will range from 0.1 to 20 percent by weight.

Since the compounds of the present invention would generally be administered by vapor or spray application, the compositions will contain a liquid diluent such as water, acetone, hexane, gasoline, kerosene, other hydrocarbon oils, alcohols or other liquids generally used in pharmaceutical preparations.

The amount of active ingredient in the composition will vary from 0.005 percent by weight to 95 percent or even higher. However, the diluent will generally constitute the major proportion of the composition and the amount of active ingredient will be less than 50 percent by weight. The exact concentration of the active ingredient will depend on the mechanism used for administration and will be easily understood by one knowledgeable in pharmaceutical application rates.

APPLICATION

A quantity of active ingredient sufficient to cause irritation to animal tissue is 100 to 5,000 micrograms per liter of air at exposure of one minute. Rates of over 10,000 micrograms per liter of air at exposure of one minute kills 50 percent of the mice which are treated.

The following additional examples are provided to more clearly illustrate the invention.

EXAMPLE 1

To a solution of 9 grams (0.15 mole) of methylisocyanate in 200 milliliters of stirring benzene is slowly added 30 grams (0.15 mole) of 4-cyclohexylmethylcyclohexylamine. The solution is then refluxed for several hours to insure completion of the reaction. The reaction system is kept dry by the use of a calcium chloride drying tube on top of the reflux condenser. After having refluxed for several hours, the solution is stripped. The residual solid is recrystallized from acetonitrile giving pure 1-(4cyclohexylmethylcyclohexyl)-3-methylurea, m.p. 156°–160° C.

Anal. Calc'd. for $C_{15}H_{28}N_2O$: C, 71.4; H, 11.2; N, 11.1%.

Found: C, 71.4; H, 11.0; N, 10.9%.

Mice are treated by aerosol exposure to this cis/trans mixture of 1-(4-cyclohexylmethylcyclohexyl)-3-methylurea in the following manner: The compound is administered as an aerosol into a 2.8 liter chamber. The exposure chamber consists of a 2.8 liter bell jar over a nebulizer inserted through the floor of the chamber. Mice are exposed for five minutes to 300.0 micrograms per liter (1,500 Ct). The compound is dissolved in 1.4 ml. of acetone and during a span of 20 seconds the compound is sprayed up into the chamber. No further air is transferred into or out of the chamber during the five minute exposure.

After this exposure, irritant effects are observed in all mice exposed, but not in controls exposed to 1.4 ml. of acetone alone. Irritant effects can be described as the presence of one or more of the following reactive signs:

a. hyperemia of the ears, nose and tail
b. abnormal gait, including rubbing of the nose on the floor while running about
c. blinking
d. salivation
e. depression
f. dyspnea
g. hunched posture
h. face-pawing.

EXAMPLE 2

A solution of 10 grams of 4-cyclohexylmethycyclohexylamine in 30 milliliters of benzene is treated with 5.4 grams of β-chloroethylisocyanate. The reactants are refluxed for several hours. The benzene is removed in vacuum and the gummy residual solids are recrystallized from acetonitrile giving pure 1-(4-cyclohexylmethylcyclohexyl)-3-(2-chloroethyl)urea: m.p. 119°–120° C.

Anal. Calc'd. for $C_{16}H_{29}ClN_2O$: C, 63.9; H, 9.7; Cl, 11.8; N, 9.3%.

Found: C, 64.2; H, 10.0; Cl, 12.0; N, 9.2%.

This compound is formulated and applied in the manner similar to the 1-(4-cyclohexylmethylcyclohexyl)-3-methylurea in Example 1 to provide like results.

EXAMPLES 3 – 28

The following compounds are made in the manner of the 1-(4-cyclohexylmethylcyclohexyl)-3-methylurea of Example 1 by substituting like amounts by weight of the appropriate starting materials. The compounds are formulated and applied in like manner to provide like results:

3. 1-(4-Cyclohexylmethylcyclohexyl)-3,3-dimethylurea. 4. 1-(4-n-Butylcyclohexyl)-3-methylurea. 5. 1-(4-n-Pentylcyclohexyl)-3-n-butylurea. 6. 1-(4-Cyclopentylmethylcyclohexyl)-3-ethylthiourea. 7. 1-(4-Cyclobutylmethylcyclohexyl)-3,3-diethylurea. 8. 1-(4-[2-methylpentyl]cyclohexyl)-3,3-di-n-propylurea. 9. 1-(4-n-Octylcyclohexyl)-3-methylurea. 10. 1-(4-n-Nonylcyclohexyl)urea. 11. 1-(4-Cyclohexylmethylcyclohexyl)urea. 12. 1-(4-n-Hexylcyclohexyl)-3-methylthiourea. 13. 1-(4-Cyclononylmethylcyclohexyl)-3-methylthiourea. 14. 1-(4-(4-Ethylheptyl)cyclohexyl)-3-methylurea. 15. 1-(4-n-Heptylcyclohexyl)-3-methyl-3-butylurea. 16. 1-(4-Cycloheptylmethylcyclohexyl)-3-methylthiourea. 17. 1-(4-n-Butylcyclohexyl)-3-(3-bromopropyl)urea. 18. 1-(4-n-Butylcyclohexyl)-3-(2-ethoxyethyl)urea. 19. 1-(4-Cyclohexylmethylcyclohexyl)-3-(2-cyanoethyl)urea. 20. 1-(4-Cyclopentylmethylcyclohexyl)-3-(2-nitroethyl)urea. 21. 1-(4-n-Pentylcyclohexyl)-3-(2-thiomethoxyethyl)urea. 22. 1-(4-(2-[2.2.1]-Bicycloheptylmethyl)cyclohexyl)-3-methylurea. 23. 1-(4-(3-Cyclopentylpropyl)cyclohexyl)-3-ethylurea. 24. 1-(4-(1-Adamantylmethyl)cyclohexyl)3-methylurea. 25. 1-(4-(2-[3.2.1]-Bicyclooctylmethyl)cyclohexyl)-3-methylurea. 26. 1-(4-(1-Homoadamantylmethyl)cyclohexyl)-3-methylurea. 27. 1-(4-(2-[3.2.1]-Bicycloheptylmethyl)cyclohexyl)-3-methylurea. 28. 1-(4-(2-[3.3.1]-Bicyclononylmethyl)Cyclohexyl)-3-methylurea.

In each of Examples 1 – 28 the cis isomer can be isolated by chromatography over silicic acid using chloroform.

EXAMPLE 29

Dogs are exposed to 1-(4-cyclohexylmethylcyclohexyl)-3-methylurea spotted on a 6 cm. circle of filter paper. The dog's head is held by an operator, and the dried paper is shaken 6 to 12 cm. from the muzzle. Within 10–30 seconds the dog salivates, licks his lips, and occasionally face-paws. Generally he struggles to escape further irritant effects. As little as 10 milligrams on paper is sufficient to cause visible discomfort in most dogs.

EXAMPLE 30

A test chamber, comprising a plastic rectangular box of 65 liters, is filled with an aerosol spray of 1-(4-cyclohexylmethylcyclohexyl)-3-methylurea. The spray is administered 2 cm. above an immobilized rabbit, and 3 cm. distant from the end of the nose. The aerosol is aimed directly at the rabbit. Administration of compound takes approximately one minute. At 5,000 Ct (5 minutes), the rabbit exhibited lacrimation, nasal exudate, face-pawing, and constant head shaking. After several minutes the eyes becamse static after periods of blinking. Dyspnea continued for 2 hours after exposure.

I claim:

1. Method of repelling animals comprising applying to an area to be protected from animals in an amount sufficient to cause irritation to animal tissue, a compound of the formula:

7

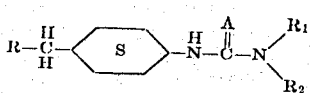

wherein
R is selected from the group consisting of alkyl of three through eight carbon atoms, cycloalkyl of four through nine carbon atoms, cycloalkylalkyl of five through 10 carbon atoms, bicycloalkyl of seven through 10 carbon atoms, and tricycloalkyl of 10 through 11 carbon atoms;

$R_1$ and $R_2$ are separately selected from the group consisting of hydrogen, alkyl of one through four carbon atoms, cyanoalkyl of one through four carbon atoms, nitroalkyl of one through four carbon atoms, alkoxyalkyl of one through four carbon atoms in the alkoxy and one through four carbon atoms in the alkyl and thioalkoxyalkyl of one through four carbon atoms in the thioalkoxy and one through four carbon atoms in the alkyl; and A is selected from the group consisting of oxygen and sulfur.

2. Method of repelling animals according to claim 1 wherein R is cycloalkyl of four through nine carbon atoms in the compound applied.

3. Method of repelling animals according to claim 1 wherein R is cyclohexyl in the compound applied.

4. Method of repelling animals according to claim 1 wherein A is oxygen in the compound applied.

5. Method of repelling animals according to claim 1 wherein $R_1$ is methyl in the compound applied.

6. Method of repelling animals according to claim 1 wherein $R_1$ is hydrogen in the compound applied.

7. Method of repelling animals according to claim 1 wherein $R_1$ is methyl, $R_2$ is hydrogen and A is oxygen in the compound applied.

8

8. Method of repelling animals comprising applying to an area to be protected from animals in an amount sufficient to cause irritation to animal tissue 1-(4-cis-cyclohexylmethyl-cyclohexyl)-3-methylurea.

9. Method of repelling animals comprising applying to an area to be protected from animals in an amount sufficient to cause irritation to animal tissue 1-(4-cis-n-butylcyclohexyl)-3-methylurea.

10. An animal irritant composition comprising a major amount of an inert liquid diluent non-toxic to animals and an amount sufficient to cause irritation to animal tissue of a compound of the formula:

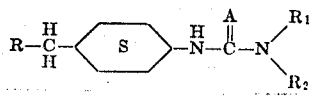

wherein
R is selected from the group consisting of alkyl of three through eight carbon atoms, cycloalkyl of four through nine carbon atoms, cycloalkylalkyl of five through 10 carbon atoms, bicycloalkyl of seven through 10 carbon atoms, and tricycloalkyl of 10 through 11 carbon atoms;

$R_1$ and $R_2$ are separately selected from the group consisting of hydrogen, alkyl of one through four carbon atoms, cyanoalkyl of one through four carbon atoms, nitroalkyl of one through four carbon atoms, alkoxyalkyl of one through four carbon atoms in the alkoxy and one through four carbon atoms in the alkyl and thioalkoxyalkyl of one through four carbon atoms in the thioalkoxy and one through four carbon atoms in the alkyl; and A is selected from the group consisting of oxygen and sulfur.

* * * * *